United States Patent [19]

Hayashi et al.

[11] Patent Number: 4,601,375
[45] Date of Patent: Jul. 22, 1986

[54] CLUTCH APPARATUS FOR VEHICLES

[75] Inventors: Tsutomu Hayashi, Hoya; Kouhei Ohzono, Fujimi, both of Japan

[73] Assignee: Honda Giken Kogyo Kabushiki Kaisha, Tokyo, Japan

[21] Appl. No.: 511,283

[22] Filed: Jul. 6, 1983

[30] Foreign Application Priority Data

Jul. 6, 1982 [JP] Japan .................. 57-117467
Jul. 10, 1982 [JP] Japan .................. 57-120135

[51] Int. Cl.4 ................................. F16D 25/061
[52] U.S. Cl. ..................... 192/85 AA; 192/85 R; 192/109 F
[58] Field of Search .......... 192/85 AA, 85 R, 85 A, 192/109 F, 52

[56] References Cited

U.S. PATENT DOCUMENTS

| | | | |
|---|---|---|---|
| 2,583,556 | 1/1952 | Fleischel | 192/85 AA X |
| 2,695,696 | 11/1954 | Iavelli | 192/109 F |
| 3,202,018 | 8/1965 | Hilpert | 192/85 AA X |
| 3,224,537 | 12/1965 | Hilpert | 192/85 AA |
| 3,351,169 | 11/1967 | McIndoe | 192/85 R |
| 3,511,349 | 5/1970 | Herscovici | 192/85 AA X |
| 3,576,241 | 4/1971 | Maurice et al. | 192/85 AA |
| 4,036,342 | 7/1977 | Finn | 192/109 F |
| 4,371,066 | 2/1983 | Fujioka et al. | 192/85 AA |

Primary Examiner—Rodney H. Bonck
Assistant Examiner—Richard M. Lorence
Attorney, Agent, or Firm—Armstrong, Nikaido, Marmelstein & Kubovcik

[57] ABSTRACT

A vehicular clutch apparatus including a clutch unit disposed between an engine output shaft and a transmission, the clutch unit having driving clutch plates and driven clutch plates interleaved with the driving plates and a piston movable upon receipt of hydraulic pressure from a pressure source to press those plates into engagement, wherein in the hydraulic flow path leading from the hydraulic pressure source to the piston is disposed a directional control valve which is interlocked with a clutch lever and for cutting off the communication between the piston and pressure source and release the hydraulic pressure fed to the piston to the atmosphere. A valve is further disposed in the flow path to automatically release the hydraulic pressure in the path to the atmosphere in response to gear shift operation, thereby disengaging the clutch unit.

5 Claims, 11 Drawing Figures

CLUTCH APPARATUS FOR VEHICLES

BACKGROUND OF THE INVENTION

1. Field of the Invention

This invention relates to a clutch apparatus for vehicles.

2. Description of the Prior Arts

Heretofore, there is known a wet type multiplate clutch for use in vehicles, for example, two-wheeled vehicles (motorcycles). The clutch of this type is constructed as follows. A first friction plate (referred to as clutch plate hereinafter) of the ring form which is movably supported within a tubular outer case in the thrust direction, and a second friction plate (referred to as friction disk hereinafter) which is supported on the outer periphery of a clutch hub penetrating through the center of the clutch plate and which is movable in the thrust direction, are brought into close contact with each other in lubricating oil, so that a rotary shaft coupled to the outer case side is connected with a rotary shaft coupled to the clutch hub side by a friction force generated between both the friction plates. Close contact of one friction plate with the other friction plate is effected by means of a spring compressedly mounted within the outer case. Disengagement therebetween is effected by operating a clutch lever which is connected, through a clutch wire, with a link mechanism adapted to compress the spring.

With such construction, however, an operating force large enough to overcome a reaction force of the spring and allowing both the friction plates to come into close contact is required to operate the clutch lever depending on leverage of the link mechanism interposed in the force transmission route. Stated differently, in case the load of the spring allowing both the friction plates to come into close contact is increased, thereby to enlarge torque capacity of the clutch, operation of the clutch lever requires more force, if leverage of the link mechanism is not increased correspondingly. But leverage of the link mechanism is restricted by various conditions, such as, mounting space in the two-wheeled vehicle, dimension of the components restrained by the mounting space, and strength of the components determined by such limited dimension. The maximum ratio is usually as much as 20 times and it is difficult to select the ratio larger than that from the standpoint of design. Therefore, enlargement of the leverage can offer only a limited controllable range of an operating force for the clutch lever. Thus, when such a clutch is applied to large-sized vehicles having large transmission torque, the diameter and number of friction plates must be increased, while maintaining constant the load of the spring, allowing those friction plates to come into close contact with one another, in order to enlarge the torque capacity with the operating force being small. This results in the size of the entire clutch being large.

Heretofore, there is also known a clutch apparatus wherein a change arm adapted to effect the gear change of a transmission is coupled to a clutch through a cam or link mechanism. The cam or link mechanism is driven with an initial movement amount of the change arm to make engagement and disengagement of the clutch when the change gear is operated. The normal gear shifting operation is performed with the latter movement amount of the change arm.

In such clutch apparatus, the initial amount of movement of the change arm and the operating load necessary for such movement are determined by leverage of the cam or link mechanism to engage and disengage the clutch. However, both factors have the relationship that an increase of one factor results in a decrease of the other factor. A fairly large stroke is required to hold the operating load within a range where the change arm can be readily operated by the hand or foot of the driver. Accordingly, in comparison with the normal transmission mechanism wherein a clutch lever is provided to engage and disengage the clutch independently of a change arm and these arm and lever are operated separately to effect the gear change, in the conventional automatic change clutch the initial amount of movement of the change arm required a relatively large stroke and hence rapid change operation is not secured. Further, as to engines which have a limited crank case width restricting the mounting space for the cam or link mechanism, the conventional automatic change clutch can not be applied to a multistage transmission with more than four stages.

SUMMARY OF THE INVENTION

This invention has been accomplished with a view of solving the above-mentioned problems in the prior art. The first object of this invention is to provide a clutch apparatus for vehicles wherein a large force is not necessary for operating a clutch lever and torque capacity can be enlarged without increasing the size of the entire clutch.

To achieve the above object, there is provided an improved clutch apparatus for vehicles, according to the invention, comprising: in a clutch unit which is composed of a first friction plate in engagement with an outer case, a second friction plate in engagement with a clutch hub penetrating through the center of the first friction plate, and a piston slidable within the outer case to press the friction plates into engagement with each other, so that the drive of an engine side rotary shaft coupled to the outer case side is engaged with or disengaged from a transmission side rotary shaft coupled to the clutch hub side; and an oil pump for supplying hydraulic oil to the piston, the improvement wherein a directional control valve is interposed in a flow path leading from the oil pump to the clutch unit, the directional control valve comprises: a housing having an inlet port connected to the oil pump side, a supply port connected to the clutch unit side, and an open port in communication with an open end; and a piston slidably fitted in the housing, and having one end interlocked with a clutch lever through a clutch wire and is moved within the housing upon operation of the clutch lever to thereby allow the supply port, the open port and the inlet port to be selectively communicated with one another.

The second object of this invention is to provide a clutch apparatus for vehicles wherein oil pressure is utilized for driving the clutch to be engaged or disengaged, a valve for controlling the flow of hydraulic oil provided in a flow path for the hydraulic oil that generates such oil pressure, the valve being interlocked with the change arm, so that a stroke of the change arm is substantially equal to that where the operation for the gear change and engaging/disengaging operation for the clutch are effected separately. The operating force is small.

To achieve the above object, there is proposed an improved clutch apparatus for vehicles, according to the invention, comprising: a clutch unit which is composed of a first friction plate in engagement with an outer case, a second friction plate in engagement with a clutch hub penetrating through the center of the first friction plate, and a piston slidable within the outer case to press the friction plates into engagement with each other, so that the drive of an engine side rotary shaft coupled to the outer case side is engaged with or disengaged from a transmission side rotary shaft coupled to the clutch hub side; and an oil pump for supplying hydraulic oil to the piston, the improvement wherein: a shift stopper having one end thereof in abutment with a shift cam secured to a shift drum of a transmission, and indexes a shift position of the shift drum rotating upon operation of a change arm; and an opening/closing valve disposed in a flow path for hydraulic oil leading from the oil pump to the clutch unit, and which is operated to allow the flow path to be open to the outside by means of the shift stopper swingable in interlocking with the shift cam when the change arm is operated.

According to the above-mentioned invention, a directional control valve is provided in a flow path leading from the oil pump to the clutch unit. The directional control valve is composed of a tubular housing having an inlet port connected to the oil pump side, a supply port connected to the clutch unit side and an open port opening to the interior of a crank case, includes a piston slidably fitted in the housing and having one end thereof connected to the clutch lever through a clutch wire and is moved within the housing to allow the supply port and the open port to be communicated with each other. When the clutch lever is pulled to move the piston of the directional control valve, both supply port and open port in the directional control valve are communicated with each other, so that hydraulic oil supplied to the clutch unit leaks from the open port to disengage the clutch. At the time of such operation of the clutch lever, the reaction force on the clutch lever is just sufficient for moving the piston of the directional control valve. The force is small compared with the prior wet multi-plate clutch wherein a spring allowing the plural friction plates to come into close contact is compressed by the clutch lever through a link mechanism. Accordingly, the clutch lever in the instant invention can be operated with a small force, thereby resulting in improvement of the operability. Further, the magnitude of oil pressure required to bring the friction plates into contact does not have much influence upon the operating force of the clutch lever for moving the piston of the directional control valve. Therefore, it is possible to provide a clutch apparatus for vehicles wherein a large force is not required for operation of the clutch lever and torque capacity can be enlarged without increasing the size of the entire clutch.

Furthermore, according to the above-mentioned second invention, the clutch apparatus is so constructed that oil pressure is utilized for driving the clutch to be engaged or disengaged, an opening/closing valve is provided in a flow path for hydraulic oil that generates such oil pressure thereby to communicate or discommunicate the flow path with respect to the outside and to control a flow of the hydraulic oil, and the opening/closing valve is operated by means of a shift stopper in interlocking with the change arm. With this construction, a force necessary for actuating the valve itself is enough to engage and disengage the clutch at the time of the gear change operation. Thus, it becomes possible to make small so much an initial movement amount of the change arm required to engage and disengage the clutch unit as well as an operating force necessary for such movement. As a result, there can be attained an automatic change clutch wherein a stroke of the change arm becomes the substantially same dimension as that in the normal transmission mechanism in which operation for the gear change and engaging/disengaging operation for the clutch are effected separately, and it is possible to equip the same number of gear change stages as that in the normal transmission mechanism, thereby resulting in a good operability.

The mechanism for operating the opening/closing valve in the present invention does not require a complicated link mechanism or the like. Such mechanism can be obtained by modifying a part of the shape of the shift stopper used in the conventional transmission so as to form a pressing portion with which the opening/closing valve is operated. Accordingly, the construction is simplified and the manufacturing cost is low. In addition, it is also easy to obtain the subtle semi-clutch state by providing a pressure regulating valve operated by the clutch lever in the flow path of hydraulic oil supplied to the clutch.

The above and other objects, features and advantages of this invention will be apparent from the following detailed description of a preferred embodiment given with reference to the accompanying drawings.

BRIEF DESCRIPTION OF THE DRAWINGS

FIGS. 1 through 9 show one embodiment of this invention in which:

DESCRIPTION OF PREFERRED EMBODIMENT

In the following, an embodiment of this invention when applied to a motorcycle will be described with reference to the drawings.

Figure 1:
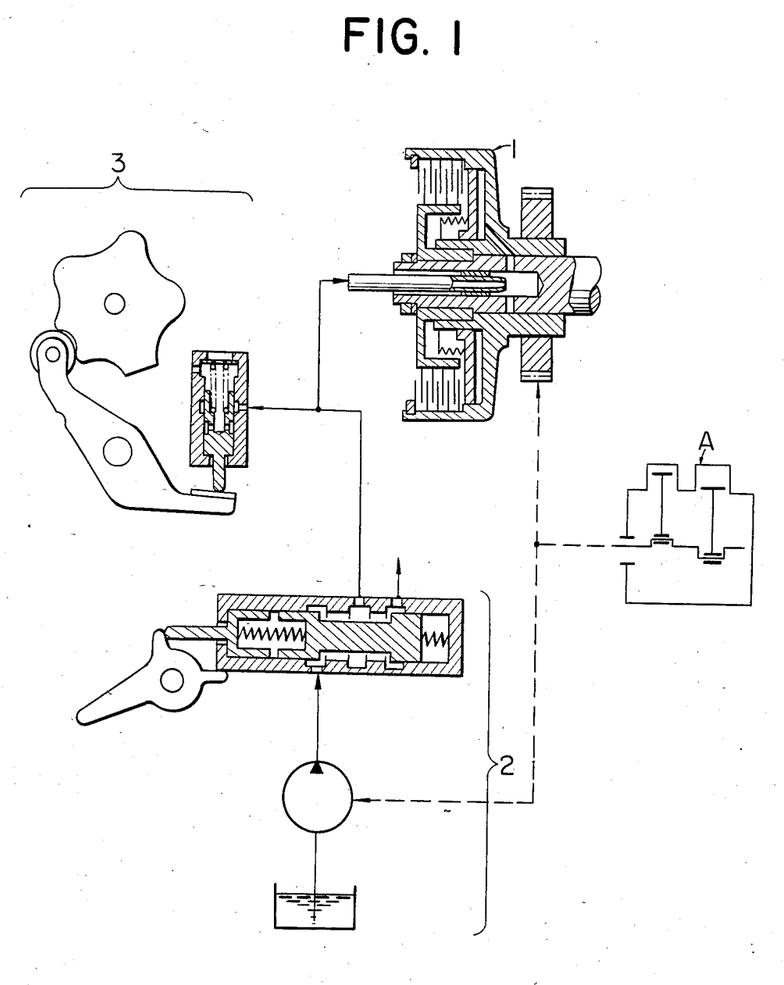
FIG. 1 is a view schematically showing a constitution for an essential part of a motorcycle embodying this invention.

Referring to FIG. 1 there is schematically shown a constitution of an essential part of the motorcycle embodying this invention, the reference numeral 1 designates a clutch unit in which friction plates come into close contact with each other by virtue of oil pressure thereby to couple an output shaft of an engine A with a main shaft of a transmission. The numeral 2 designates a first operating mechanism adapted to adjust a supply amount of hydraulic oil fed to the clutch unit 1 upon operation of a clutch lever. The numeral 3 designates a second operating mechanism adapted to adjust a supply amount of hydraulic oil fed to the clutch unit 1 upon operation of a gear change arm. The clutch unit 1, the first operating mechanism 2 and the second operating mechanism 3 constituting a hydraulic clutch apparatus.

Figure 2:
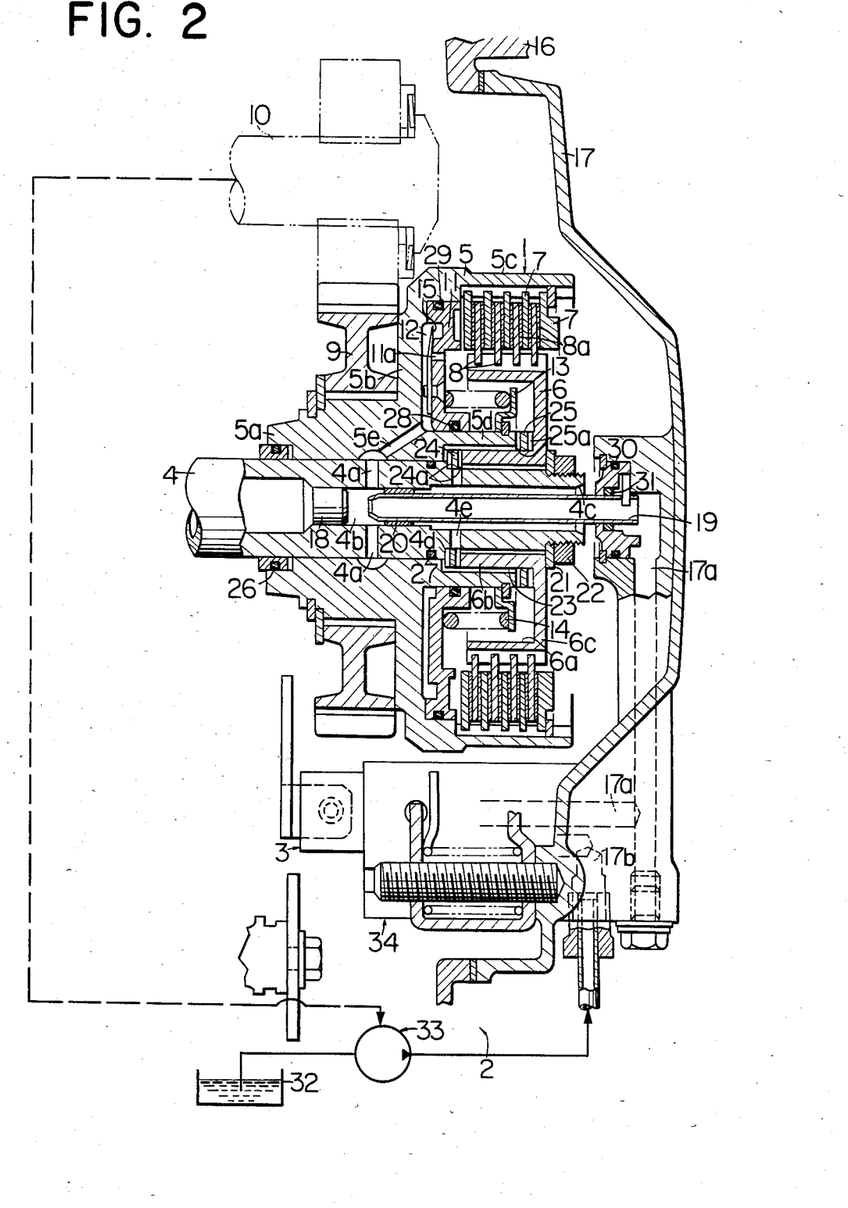
FIG. 2 is a sectional view of a clutch unit.

In the clutch unit 1, as shown in FIG. 2, an outer case 5 rotatably fitted to a main shaft 4 of the transmission and a clutch hub 6 spline-fitted to the main shaft 4 are connected with each other by virtue of a friction force generated between first friction plates 7 (referred to as clutch plate hereinafter) in plural number (five in the figure) attached to the outer case 5 and second friction plates 8 (referred to as friction disk hereinafter) in plural number (four in the figure) attached to the clutch hub 6, whereby a rotational force transmitted to the outer case 5 from the output shaft 10 of the engine through a primary driven gear 9 secured to the outer case 5 is further transmitted to the main shaft 4.

The outer case 5 comprises a boss portion 5a rotatably fitted to the main shaft 4, a rear wall portion 5b radially extending from the boss portion 5a, an outer tubular portion 5c projecting from the outer edge of the rear wall portion 5b in the axial direction of the main shaft 4 and having a tubular form in concentric relation with respect to the main shaft 4, and an inner tubular portion 5d located inside of the outer tubular portion 5c and projecting from the rear wall portion 5b in a tubular form with a predetermined spacing from the main shaft 4, these four parts being formed integrally. The ring-shaped clutch plates 7 are attached to the inner periphery of the outer tubular portion 5c to be movable in the axial direction of the main shaft 4, and a ring-shaped piston 11 is fitted in a ring-shaped space defined between the outer tubular portion 5c and the inner tubular portion 5d at a position nearer the rear wall portion 5b rather than the clutch plates 7 so as to be slidable in the axial direction of the main shaft 4.

Figure 3:
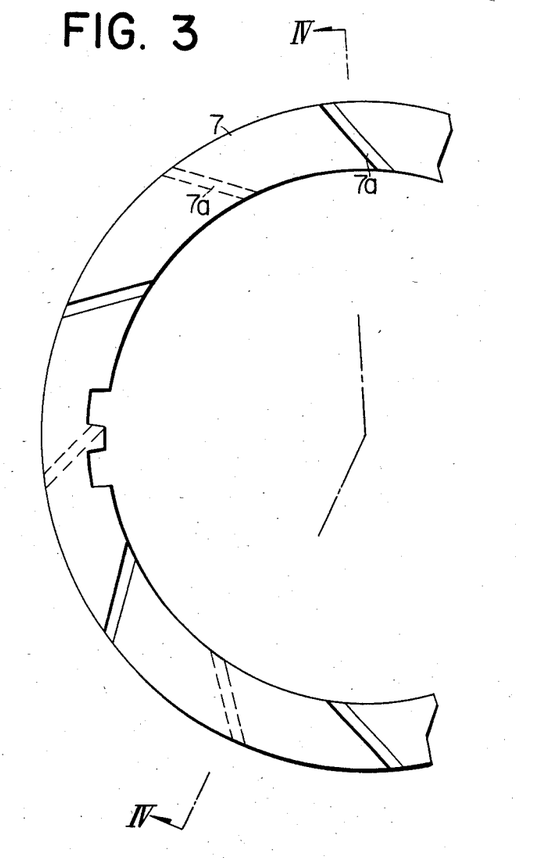
FIG. 3 is a plan view of a clutch plate shown in FIG. 2.
Figure 4:
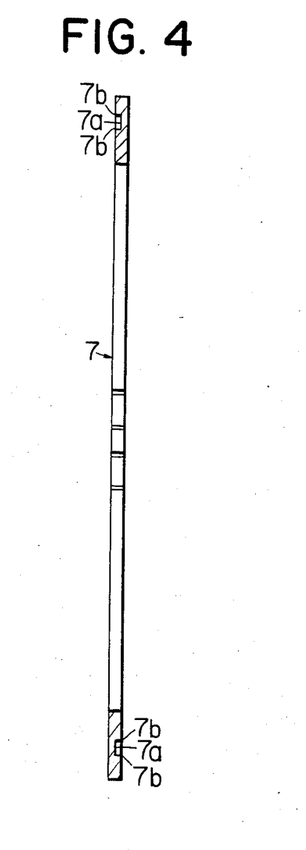
FIG. 4 is a sectional view taken along the line IV—IV in FIG. 3.
Figure 5:
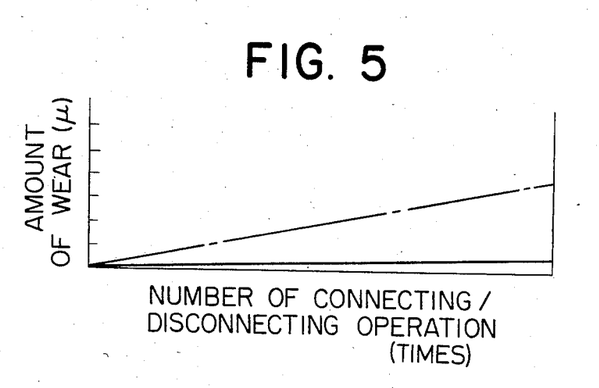
FIG. 5 is a graph showing the relationship between a wear amount of a friction plate and the number of clutch connecting/disconnecting operation.

As shown in FIGS. 3 and 4, each of the clutch plates 7 is formed with a plurality of radial grooves 7a on both sides thereof coming into contact with the friction disks 8. Each of the radial grooves 7a has acute edge portions 7b extending substantially in the radial direction of the clutch plate 7, and the edge portions 7b serve to sever oil film formed between the clutch plate 7 and the friction disk 8, thereby to prevent intervention of a useless oil film between both the friction plates 7 and 8 and contribute to stabilize a friction characteristic. Each of the friction disks 8 has a facing portion 8a coming into surface contact with the clutch plate 7, which portion 8a is formed of a copper sintered alloy material or papermanufactured material (i.e., resin mold material made by the papermanufacturing method). As to the friction disk 8 having the facing portion 8a formed of a copper sintered alloy material, a wear resistance test was conducted in such a condition that engagement and disengagement are repeated with the friction disks being rotated at the low number of revolutions. The resultant data is shown in FIG. 5 where the axis of ordinates represents a wear amount (unit; $\mu$) of the friction disks 8 in number eight and the axis of abscissas represents the number of connecting/disconnecting operation (unit; times). As will be seen from the figure in which the solid line indicates the data for the friction disks 8 according to this invention and the one-dot chain line indicates the data for the conventional disks formed of an organic friction material, those disks which are formed of a copper sintered alloy material have much smaller wear amount than the conventional disks. Such large reduction in the wear amount makes it possible to raise the surface pressure P exerted on the friction disks 8 up to a level of 10 kg/cm$^2$, even taking into account an increase of the wear amount which will be caused due to the enlarged surface pressure exerted on the friction disks 8 as well as an increased need of maintenance such as exchange of disks which will be resulted from the accelerated wear amount. In case the facing portion 8a of each friction disk 8 is formed of a papermanufactured material, it is also possible to raise the surface pressure up to the nearly same level as the case of using a sintered alloy material.

Such a sintered alloy material or papermanufactured material can be used for either one or both of the first and second friction plates 7 and 8. With this, the surface pressure exerted on the friction plates 7 and 8 can be raised up sufficiently, so that an average radius and the number of the friction plates 7 and 8 may be decreased corresponding to an increase of the surface pressure. This further results in reduction in size and weight of the entire clutch unit 1.

The aforesaid piston 11 cooperates with the rear wall portion 5b of the outer case 5 to form a pressure chamber 12 therebetween, and it is urged toward the rear wall portion 5b by means of a resilient member 14 which is compressedly interposed between the piston 11 and a spring seat 13 fixedly positioned on the inner tubular portion 5d. The piston 11 is formed with a communicating hole 11a adapted to communicate the pressure chamber 12 with a space on the side of the resilient member 14 or the clutch plates 7, and a reed valve 15 is fixed to the surface of the piston 11 on the pressure chamber side thereby to open and close the communicating hole 11a. The reed valve 15 is formed of an elastic piece such as a thin metal plate and mounted to the piston 11 with a small gap being held between the valve itself and the communicating hole 11a, so that, when there generates oil pressure within the pressure chamber 12, the reed valve 15 is elastically deformed toward the side of the communicating hole 11a due to such pressure to close the same. The pressure chamber 12 is communicated with an inlet path 4b formed in the main shaft 4 through an oil path 5e bored in the boss portion 5a of the outer case 5 and an oil path 4a bored in the main shaft 4 to extend in the radial direction. The inlet path 4b is defined between a plug 18 and a metal bearing 20, the former closing one end of a hole bored in the main shaft 4 to extend in the axial direction thereof and the latter supporting a feed pipe 19 in the intermediate portion of the hole. The feed pipe 19 has one end which is communicated with an oil path 17a bored in a clutch cover 17 bolted to a clutch case 16, and the other end which is inserted into the inlet path 4b from the end 4c of the main shaft 4.

The clutch hub 6 is composed of an outer tubular portion 6a which movably supports each ring-shaped friction disk 8 interposed between the adjacent clutch plates 7 in the axial direction of the main shaft 4, a boss portion 6b which is inserted in a tubular spacing between the inner tubular portion 5d of the outer case 5 and the main shaft 4 and which is spline-coupled to the main shaft 4, and a rear plate portion 6c which connects the outer tubular portion 6a to the boss portion 6b, these three parts being formed integrally. A movement of the clutch hub 6 in the thrust direction is restricted by means of washer 21 and nut 22 which are fitted to the main shaft end 4c. An outer diameter of the boss portion 6b is made smaller than the inner diameter of the inner tubular portion of the outer case 5 so as to form an oil path 23 therebetween. Also, the portion of the main shaft 4 to which is fitted the clutch hub 6 has a smaller outer diameter than the portion thereof to which is fitted the outer case 5, and thrust washers 24 and 25 are respectively disposed between a stepped portion 4d constituting the boundary of the outer case 5 side and an end face of the boss portion 6b of the clutch hub 6 and between an end face of the inner tubular portion 5d of the outer case 5 and the rear plate portion 6c of the clutch hub 6. These thrust washers 24 and 25 are formed with oil grooves 24a and 25a on their both sides, respectively, and the inlet path 4b in the main shaft 4 is communicated with a space within the outer case 5 on the side of the resilient member 14 through the oil grooves 24a, 25a, the oil path 23 and the oil path 4e bored in the main shaft 4 to extend in the radial direction. Besides, the reference numerals 26 through 31 designate seal rings adapted to achieve liquid-tightness between the respective members fitted with each other. More specifically, the seal rings 26 and 27 disposed at both ends of the boss portion 5a of the outer case 5 fitted to the main shaft 4 serve to prevent hydraulic oil flowing from the inlet path 4b in the main shaft 4 to the pressure chamber 12 through the oil paths 4a and 5e from leaking through a gap between the main shaft 4 and the boss portion 5a, thereby to avoid reduction in pressure of hydraulic oil to be supplied into the pressure chamber 12. But, these seal rings 26 and 27 do not seal completely the gap between the main shaft 4 and the boss portion 5a, and are designed to allow a slight leak therebetween. That is, it is so designed that the hydraulic oil leaked through the small-diameter seal ring 27 is made to reach the side of the clutch plates 7 and the friction disks 8 passing through the oil path 23 between the inner tubular portion 5d of the outer case 5 and the boss portion 6b of the clutch hub 6 as well as the oil grooves 25a of the thrust washer 25, thereby contributing to cool both the friction plates. Further, the hydraulic oil leaked through the metal bearing 20 for supporting the feed pipe 19 is also fed to the side of the friction plates through the oil path in the main shaft 4, oil grooves 24a of the thrust washer 24, oil path 23, and the oil grooves 25a of the thrust washer 25, thereby contributing to cool the friction plates.

Figure 6:
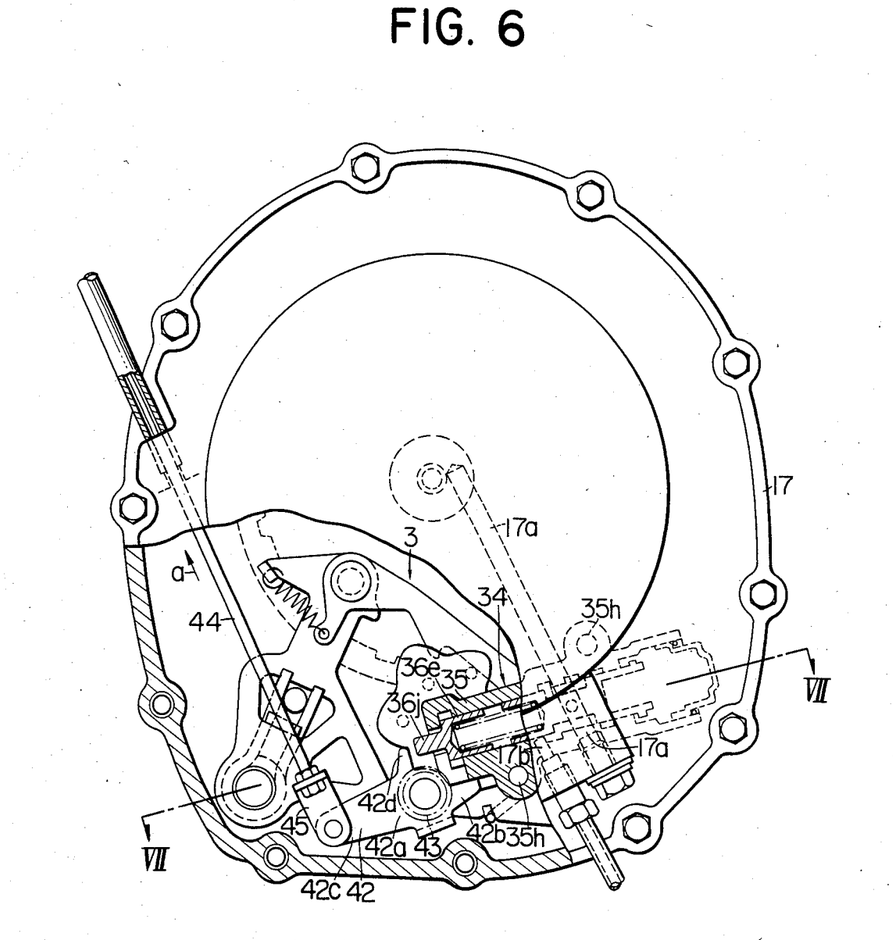
FIG. 6 is a front view, partly in section, taken from the right end, FIG. 2.
Figure 7:
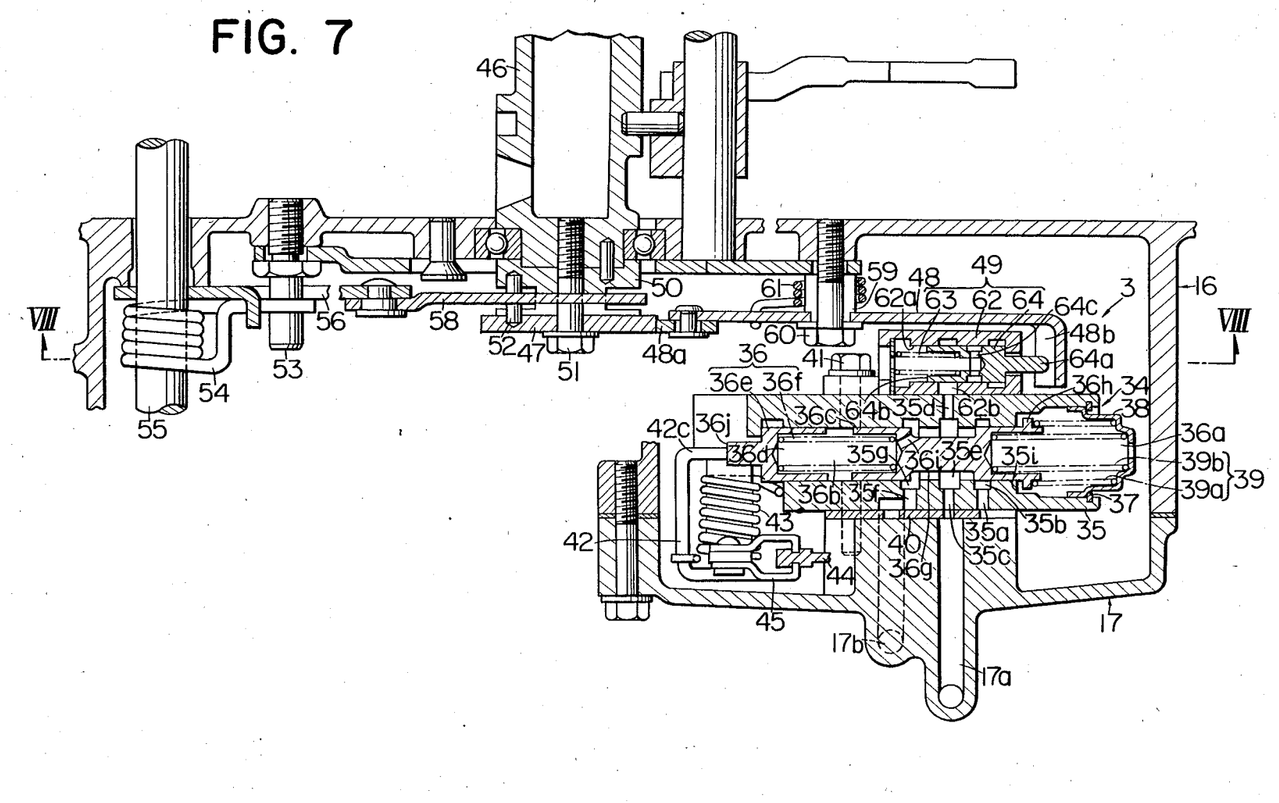
FIG. 7 is a sectional view taken along the line VII—VII in FIG. 6.

As shown in FIGS. 2, 6 and 7, the aforesaid first operating mechanism 2 is composed of an oil pump 33 which is driven interlockingly with the output shaft 10 of the engine to supply hydraulic oil from an oil pan 32 below the crank case 16 to an oil supply path 17b bored in the clutch cover 17, and a directional control valve 34 which is mounted to the clutch cover 17, which connects between the inlet path 17b communicated with the oil pump 33 and the oil path 17a communicated with the pressure chamber 12 of the clutch unit 1, and which opens or closes those oil paths within the crank case 16 upon operation of a clutch lever (not shown) provided in a handle section of the motorcycle, thereby to switch the flow direction of hydraulic oil.

The oil pump 33 supplies hydraulic oil to the pressure chamber 12 of the clutch unit 1 through the oil supply path 17b, directional control valve 34, oil path 17a, and the feed pipe 19 so as to actuate the piston 11 and hence to press both the clutch plates 7 and the friction disks 8. At this time, the oil pump 33 has a lift enough to produce the surface pressure of approximately 10 kg/cm$^2$ between the friction plates 7 and 8.

As shown in FIG. 7, the directional control valve 34 is composed of a housing 35 in the form of a tube, a piston 36 slidably fitted in the housing 35, a dish-like spring seat 38 positioned by means of a stop ring 37 which is fitted to one end of the housing 35, and a resilient member 39 compressedly interposed between the spring seat 38 and the piston 36 thereby to urge the piston toward the other end of the housing 35.

The inner peripheral surface of the housing 35 on which slides the piston 36, includes a first peripheral groove 35b having an open port 35a communicated with the interior of the crank case 16, a second peripheral groove 35e having a supply port 35c communicated with the oil path 17a in the clutch cover 17 and an exhaust port 35d opened and closed by the second operating mechanism 3, and a third periphery groove 35g having an inlet port 35f communicated with the oil supply path 17b in the clutch cover 17, these three peripheral grooves being located in this order from one side of the housing 35. The housing 35 is in close contact with the inner surface of the clutch cover 17 via a separate plate 40 and is fixed to the clutch cover 17 by means of a bolt 41 which is inserted through each fixing hole 35h (FIG. 6) formed in the outer periphery thereof.

The piston 36 is composed of a regulator piston 36c which is fitted in the housing 35 near the ports 35c, 35d and 35f to be slidable over those ports and which has recessed portions 36a and 36b at both ends thereof, respectively, a control piston 36e which is slidably fitted in the housing 35 on the other end side and which has a recessed portion 36d at the end portion thereof on the side of the regulator piston 36c, and a resilient member 36f which is compressedly interposed in and between the facing recessed portions 36b and 36d of both the pistons 36c and 36e and which urges both the pistons 36c and 36e in the separating direction so as to form a gap therebetween. The regulator piston 36c has a groove 36g formed on the outer periphery thereof centrally in the longitudinal direction to define a flow path between the groove itself and the inner peripheral surface of the housing 35, and it has also a flanged portion 36h projecting from the outer periphery of the end thereof on the side of the spring seat 38. This flanged portion 36h is brought into abutment with a stepped portion 35i of the housing 35, thereby to restrict the movement of the regulator piston 36c toward the other end side of the housing 35. The groove 36g includes a connecting hole 36i communicated with the recessed portion 36b, so that a part of the hydraulic oil flowing within the groove 36g is introduced into the side of the recessed portion 36b. The hydraulic oil flowing into the recessed portion 36b generates a back pressure acting on the regulator piston 36c to press it rightward on FIG. 7. When the pressure of the hydraulic oil exceeds a set value, the regulator piston 36c is moved rightward on FIG. 7, thereby to leak the hydraulic oil within the housing 35 through the open port 35a. In other words, the resilient member 39 adapted to urge the regulator piston 36c toward the other end side of the housing 35 is composed of a first resilient member 39a in abutment with the flanged portion 36h of the piston 36c and a second resilient member 39b in abutment with the recessed portion 36a of the piston 36c, the loads of both the resilient member 39 and the resilient member 36f between the two pistons 36c and 36e are selected such that they are balanced when the pressure of the hydraulic oil is equal to a set value. That is, the regulator piston 36c is endowed with a function as a relief valve.

The control piston 36e includes an operating shaft portion 36j projecting toward the other end of the housing 35, and both the control piston 36e and the regulator piston 36c are operated by an arm 42 supported by the clutch cover 17. As shown in FIG. 6, the arm 42 is composed of a fulcrum portion 42a at which it is rotatably supported by the clutch cover 17 and urged by means of a spring 43 in the counterclockwise direction on FIG. 6, a locking pawl 42b which comes into abutment with the outer periphery of the housing 35 to lock the counterclockwise rotation of the arm, and a pair of arm portions 42c and 42d projected to form the bell crank arrangement. One arm portion 42c is connected through a connection fitting 45 with a clutch wire 44 which in turn is connected to the clutch lever (not shown). Meanwhile, the other arm portion 42d has its leading end directed to the operating shaft portion 36j of the control piston 36e and, when the clutch lever is pulled to draw the clutch wire 44 upward as shown by an arrow (a) in FIG. 6, the arm portion 42d is rotated in the clockwise direction against the spring 48 so as to press the control piston 36e. As a result, both the control piston 36e and the regulator piston 36c are moved rightward on FIG. 6 by a distance corresponding to the rotation amount of the arm 42.

Figure 8:
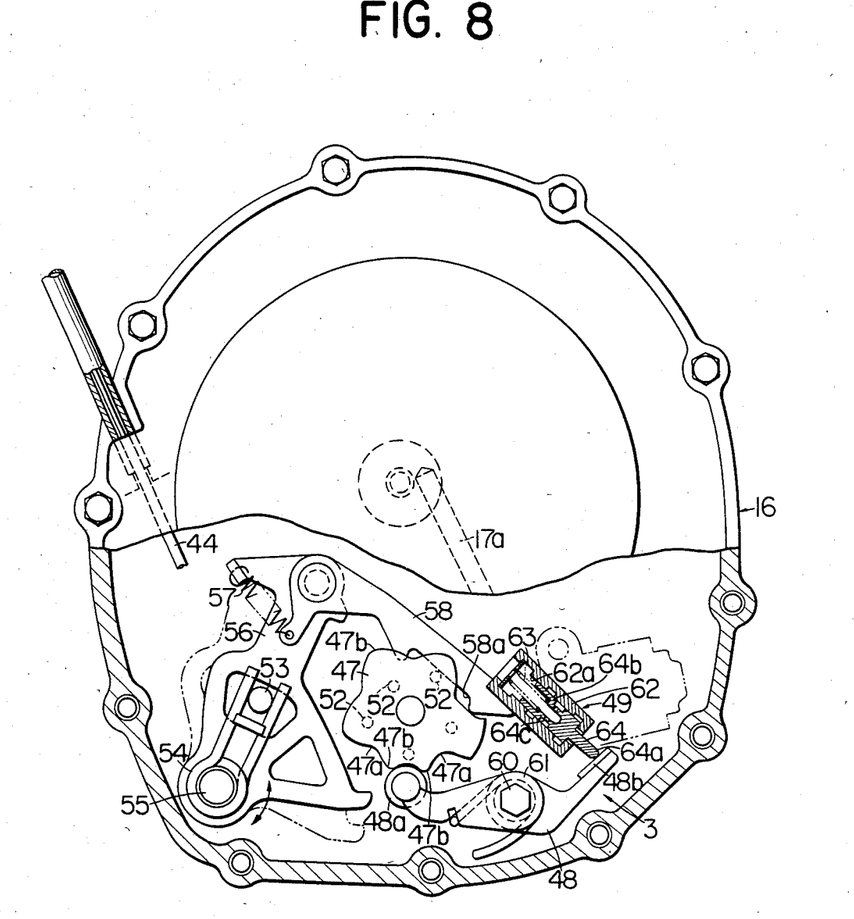
FIG. 8 is a sectional view taken along the line VIII—VIII in FIG. 7.

As shown in FIGS. 7 and 8, the aforesaid second operating mechanism 3 is composed of a shift stopper 48 which has one end in abutment with a shift cam 47 secured to a shift drum 46 and which indexes a shift position of the shift drum 46 turned upon the gear change operation, and an opening/closing valve 49 which is disposed in a flow path of hydraulic oil leading from the oil pump 33 to the clutch unit 1 and which opens or closes the flow path with respect to the outside (i.e., interior of the crank case 16) interlockingly with the shift stopper 48.

The shift cam 47 is formed of a plate material which has its outer periphery formed with recessed portions with an appropriate spacing therebetween in number corresponding to the required number of gear change stages of the transmission, resulting in a substantially star form, and it is fixed to the shift drum 46 by means of a bolt 61 together with a shift drum center 50. Between the shift drum center 50 and the shift cam 47 are disposed rollers 52 corresponding to the number of gear change stages of the transmission. The rollers 52 are connectable to the change arm (not shown) secured to one end (i.e., upper end on FIG. 7) of a gear shift spindle 55, through the gear shift spindle 55 rotatably supported by the crank case 16 and restricted its rotation elastically by means of a return spring 54 having the both ends in abutment with a pin 53 fixed to the crank case 16, an arm 56 secured to the gear shift spindle 55, an actuating arm 58 supported by the arm 56 and urged by means of a spring 57 toward the side of the roller 52 for transmitting a rotational force to the roller 52 through a locking groove 58a formed on the roller side. Upon operation of the change arm, the rollers 52 receive a rotational force intermittently, so that both the shift drum 46 and the shift cam 47 are rotated integrally.

The shift stopper 48 is a lever-like member having the intermediate portion in the lenghtwise direction thereof, which portion is rotatably supported by the crank case 16 through a collar 59 and a bolt 60. A pressing roller 48a provided at one end of the shift stopper 48 is protruded into a recessed portion 47a of the shift cam 47 by virtue of an elastic force of a stopper spring 61 fitted round the collar 59, thereby to index a fixing position of the shift cam 47, whereas an operating plate portion 48b formed at the other end of the shift stopper 48 operates the opening/closing valve 49 when the shift stopper 48 is swung upon rotation of the shift cam 47.

The opening/closing valve 49 is composed of a tubular housing 62 secured to the directional control valve 34, and a spool 64 fitted slidably within the housing 62 and urged toward the one end side (right end side on FIG. 7) by means of a resilient member 63. The housing 62 has a connection port 62b communicating an inner peripheral portion 62a slidably receiving the spool 64 with an exhaust port 35d of the directional control valve 34, the inner peripheral portion 62a being open at the other end side (left end side on FIG. 7). The spool 64 includes a shaft portion 64a projecting through the housing 62 on the one end side, and a skirt portion 64b extending reversely from the shaft portion 64a and fitted to the inner peripheral portion 62a of the housing 62. When the shaft portion 64a is pressed by the operating plate portion 48b of the shift stopper 48, the spool 64 is moved within the housing 62 leftward in FIG. 7. The skirt portion 64b is formed at a position offset rightward with respect to the connection port 62b of the housing 62 with a communicating hole 64c in communication with the inner peripheral portion 62a of the housing 62. With this, only when the spool 64 is moved leftward in FIG. 7 upon a swing motion of the shift stopper 48, the connection port 62b of the housing 62 is communicated with the inner peripheral portion 62a thereof, whereby the hydraulic oil having entered the interior of the directional control valve 34 is leaked from the open end of the housing 62.

Hereinafter operation of the above-mentioned embodiment of this invention will be described.

As a mechanism for engaging and disengaging the clutch unit 1, the foregoing clutch apparatus in accordance with one embodiment of this invention is equipped with the first operating mechanism 2 adapted to adjust a supply amount of hydraulic oil to the clutch unit 1 upon operation of the clutch lever, and with the second operating mechanism 3 adapted to adjust a supply amount of hydraulic oil to the clutch unit 1 interlockingly with operation of the gear change arm of the transmission. At the time of gear change, the clutch lever may be operated to disengage the clutch prior to operation of the gear change arm of the transmission, or only the change arm may be operated to effect gear change without operating the clutch lever.

(I) There will be first described the case where the clutch unit 1 is engaged and disengaged using the clutch lever. In this case, the exhaust port 35d of the directional control valve 34 is closed by the opening/closing valve 49 of the second operating mechanism 3.

The oil pump 32 is stopped during stop of the engine, and it is driven in accordance with the number of revolutions of the engine during operation of the engine, thereby to supply hydraulic oil to the directional control valve 34 through the oil supply path 17b in the clutch cover 17.

Figure 9A:
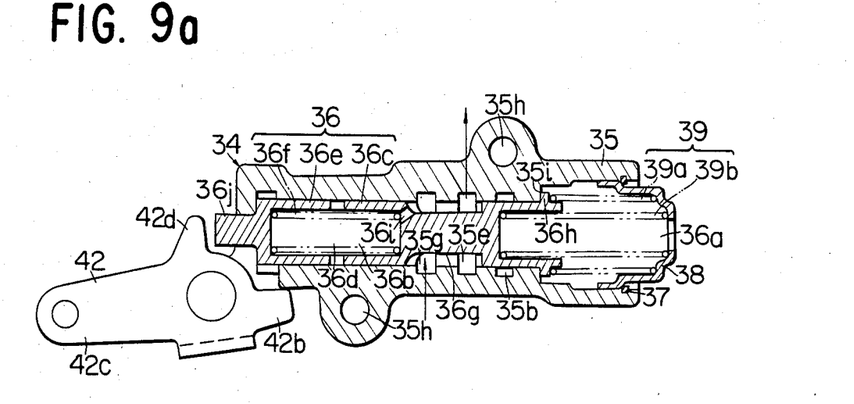
FIGS. 9(a), 9(b) and 9(c) are views for explaining operation of a directional control valve.

With the clutch lever being not pulled, both the control piston 36e and the regulator piston 36c in the directional control valve 34 are, as shown in FIG. 9(a), are positioned at the leftmost side by virtue of urging forces of the resilient members 36f and 39 as well as oil pressure within the recessed portion 36b of the regulator piston 36c (in case the pump supply oil pressure is higher than a set value, however, the regulator piston 36c is moved rightward by virtue of the oil pressure within the recessed portion 36b to allow the open port 35a to be opened).

In this way, when both the pistons 36e and 36c are positioned at the leftmost side in the housing 35, the inlet port 35f communicated with the oil supply path 17b is connected to the supply port 35c communicated with the oil path 17a through the groove 36g of the regulator piston 36c and, at the same time, the open port 35a is closed by the outer peripheral surface of the regulator piston 36c. Therefore, all of the hydraulic oil having entered the directional control valve 34 is introduced to the pressure chamber 12 of the clutch unit 1 through the oil path 17a, feed pipe 19 and the oil path 4a in the main shaft 4, so that the piston 11 is moved rightward in FIG. 2 to bring the clutch plates 7 and the friction disks 8 into close contact with each other, thereby to connect between the outer case 5 and the clutch hub 6.

Figure 9B:
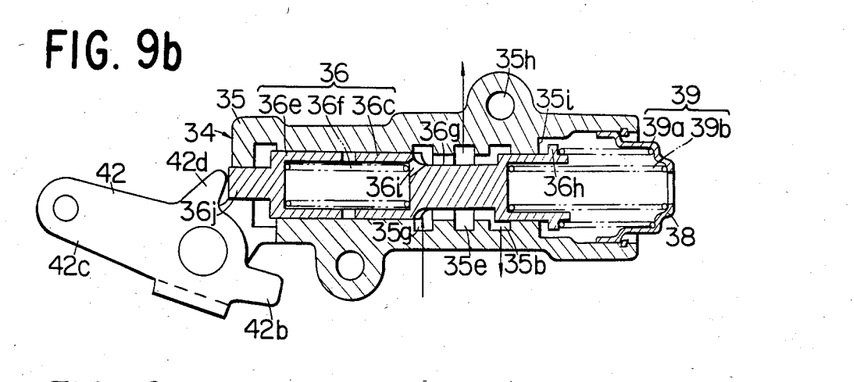
Figure 9C:
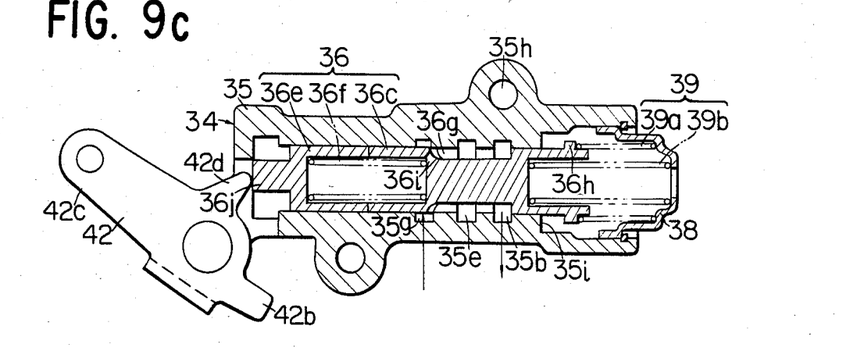

When the clutch lever is pulled, the arm 42 is turned through the clutch wire 44 and then the control piston 36e is pressed, whereby the control piston 36e is moved rightward in FIG. 7. Upon this rightward movement of the control piston 36e, the resilient member 36f is compressed and, when a rightward force acting on the regulator piston 36c by virtue of the resilient member 36f and the oil pressure within the recessed portion 36b exceeds a leftward force acting on the regulator piston 36c by virtue of the resilient member 39, the regulator 36c is moved rightward so that the inlet port 35f, the supply port 35c and the open port 35a are communicated with one another. In accordance with the opening degree of the first peripheral groove 35b including the open port 35a, the hydraulic oil having entered the directional control valve 34 is discharged to the interior of the crank case 16 through the open port 35a. Corresponding to this discharge amount, an amount of the hydraulic oil flowing into the pressure chamber 12 through the oil path 17a and the feed pipe 19 is decreased and hence the oil pressure within the pressure chamber 12 is lowered. Upon such fall of the pressure, the reed valve 15 of the piston 11 is deformed to open the communicating hole 11a, thus allowing the remaining hydraulic oil within the pressure chamber 12 to flow into the friction plate side. With this, the piston 11 is returned to the original position by virtue of an urging force of the resilient member 14, so that the outer case 5 and the clutch hub 6 are disengaged from each other. In this connection, since a movement amount of the regulator piston 36c along with the movement of the control piston 36e becomes smaller than that of the control piston 36e by a distance corresponding to a flexural amount of the resilient member 36f interposed between both the pistons 36c and 36e, as shown in FIG. 9(b), in the state where there exists a spacing between both pistons 36c and 36e, it is possible to easily obtain the proper semi-clutch state. Further, in the state that the pistons 36c and 36e are in contact with each other, as shown in FIG. 9(c), a movement amount of the regulator piston 36c becomes equal to that of the the control piston 36e, whereby the opening degree of the open port 35a is increased in a short time so as to disengage the clutch in a short time correspondingly. The hydraulic oil having entered the side of the friction plates 7 and 8 from the pressure chamber 12 through the communicating hole 11a at the time when the clutch is disengaged, returns to the lower portion of the crank case after cooling both the friction plates 7 and 8. After the clutch lever is pulled to bring the clutch into the disconnected state in this manner, the change arm is operated to effect the gear change and then the clutch lever is turned to the original position. Such operation of the clutch lever to disengage the clutch unit 1 is effective particularly in the case where the motorcycle is driven in the semi-clutch state.

(II) Hereinafter, there will be described the case where only the change arm of the transmission is directly operated to effect the gear change without operating the clutch lever, with reference to FIG. 8.

When the clutch lever is not pulled, the open port 35a of the directional control valve 34 will never open unless the pressure of hydraulic oil becomes larger than a set value, so that hydraulic oil flows from the oil pump 33 into the clutch unit 1, thereby to maintain the clutch unit 1 in the connected state. In such state, when the change arm (not shown) is operated to turn the gear shift spindle 55, a rotational force is transmitted to the shift cam 47 through the arm 56 and the actuating arm 58. Upon this, when the shift cam 47 starts to rotate, a convex portion 47b forming the recessed portion 47a of the shift cam 47 pushes the pressing roller 48a of the shift stopper 48 downward in FIG. 8, so that the shift stopper 48 is turned in the counterclockwise direction in FIG. 8, thereby to move the spool 64 of the opening/closing valve 49 leftward in FIGS. 7 and 8. With a rotation angle of the shift cam 47 being increased, the contact point between the convex portion 47b of the shift cam 47 and the pressing roller 48a of the shift stopper 48 gradually approaches the peak of the convex portion 47b, whereby a rotation amount of the shift stopper 48 in the counterclockwise direction, i.e., a leftward movement of the spool 64, is enlarged correspondingly. And when the connection port 62b in the housing 62 of the opening/closing valve 49 is aligned with the communicating hole 64c of the spool 64 and hence the exhaust port 35d of the directional control valve 34 is opened, the hydraulic oil flowing through the directional control valve 34 is leaked to stop supply of the hydraulic oil to the clutch unit 1, so that the clutch is disengaged. In this way, the shift stopper 48 is turned in the counterclockwise direction in FIG. 8 to move the spool 64 of the opening/closing valve 49 leftward until the peak of the convex portion 47b of the shift cam 47 comes into abutment with the pressing roller 48a of the shift stopper 48. And when the pressing roller 48a exceeds the peak of the convex portion 47b, the shift stopper 48 is now turned in the clockwise direction and hence the spool 64 starts to return to the original position. In this process, until the spool 64 moves rightward and reaches the position where the hydraulic oil ceases to leak, the clutch is maintained in the disengaged state continuously and the gear change is effected with the rotation of the shift drum 46 during this period. After completion of the gear change, the shift cam 47, shift stopper 48 and the spool 64 are returned to the original position, whereby the exhaust port 35d of the directional control valve 34 is closed. Upon this, hydraulic oil is supplied to the clutch unit 1 once again, so that the clutch comes into the engaged state. By the way, a force necessary for moving the spool 64 of the opening/closing valve 49 can be set independently of the magnitude of the oil pressure used for disengaging the clutch unit 1 and, therefore, can be selected very small. Also, a movement amount of the spool 64 necessary for disengaging the clutch unit 1, i.e., a spaced distance between the connection port 62b of the housing 62 and the communicating hole 64c of the spool 64 in FIG. 7, is independent of an operating force for the spool 64 and hence can be set very short. Accordingly, an initial movement amount of the change arm required to engage and disengage the clutch unit 1 as well as an operating force required at that time can be made small so much. In other words, it becomes possible to constitute an automatic change clutch which has the size substantially equal to that in case of the normal transmission mechanism where operation for the gear change and operation for engaging/disengaging the clutch are effected separately, and which has the same gear change stages (for example, multistages such as 5 or 6 speeds) as the conventional one.

In addition, a hydraulic type centrifugal clutch can be constituted by additionally providing a centrifugal type pressure regulating valve to the hydraulic clutch apparatus which comprises the clutch unit 1 and the first operating mechanism 2 in accordance with the above-mentioned embodiment.

What is claimed is:

1. A clutch apparatus for vehicles, said clutch apparatus having first friction plates in engagement with an outer case, second friction plates in engagement with a clutch hub penetrating through the center of said first friction plates, and a piston slidable within said outer case for pressing said friction plates into engagement with each other, so that rotation from an engine side rotary shaft coupled to the outer case side is transmitted to a transmission side rotary shaft coupled to the clutch hub side; an oil pump for supplying hydraulic oil pressure to said piston for engaging said friction plates with each other; and a directional control valve interposed in the flow path leading from said oil pump to said clutch unit, the improvement wherein said directional control valve comprises: a housing having an inlet port leading to the oil pump, a supply port connected to the clutch unit, and an open port in communication with an open end; a regulator piston slidably fitted in said housing for movement into a first position at which said inlet port is communicated with said supply port and a second position at which said supply port is communicated with said open port; a control piston slidably fitted in said housing on substantially the same axis as the axis of said regulator piston, said control piston being in interlocked relation to a clutch lever through a clutch wire; a first resilient member interposed between said control piston and said regulator piston for allowing relative axial movements between said pistons; a second resilient member disposed in said housing for biasing said regulator piston toward said first position and against a resilient force of the first resilient member; said regulator piston having a connecting hole for introducing a part of the hydraulic pressure fed through the inlet port to one end face of said regulator piston to bias said regulator piston toward said second position.

2. A clutch apparatus according to claim 1, wherein said regulator piston and said control piston have end portions opposed to each other, said end portions being spaced from each other when said clutch lever is in a semi-clutch position to keep said open port half-opened and communicated with both the inlet and supply ports.

3. A clutch apparatus according to claim 2, wherein when said clutch lever is moved to a clutch state, the end portions of the regulator and control piston are abutted against each other and the open port is fully opened and goes out of communication with said inlet port.

4. A clutch apparatus according to claim 1, wherein at least one of said first and second friction plates are formed of a sintered alloy.

5. A clutch apparatus according to claim 1, wherein at least one of said first and second friction plates are formed of a paper-manufactured material.

* * * * *